(12) United States Patent
Harwood et al.

(10) Patent No.: US 7,073,338 B2
(45) Date of Patent: Jul. 11, 2006

(54) THERMALLY CONTROLLED STORAGE SPACE SYSTEM FOR AN INTERIOR CABIN OF A VEHICLE

(75) Inventors: Jody K. Harwood, Canton, MI (US); Joseph J. Davis, Jr., Ortonville, MI (US); James D. Hughes, Goodrich, MI (US)

(73) Assignee: Lear Corporation, Southfield, MT (US)

( * ) Notice: Subject to any disclaimer, the term of this patent is extended or adjusted under 35 U.S.C. 154(b) by 207 days.

(21) Appl. No.: 10/707,281

(22) Filed: Dec. 3, 2003

(65) Prior Publication Data

US 2005/0178128 A1    Aug. 18, 2005

(51) Int. Cl.
   *F25B 21/02* (2006.01)
(52) U.S. Cl. .............................. 62/3.61; 62/3.2; 62/244
(58) Field of Classification Search ................. 62/3.2, 62/3.3, 3.6, 3.61, 239, 244, 153
   See application file for complete search history.

(56) References Cited

U.S. PATENT DOCUMENTS

| 4,280,330 | A | * | 7/1981 | Harris et al. ................... 62/3.3 |
| 4,489,242 | A | * | 12/1984 | Worst ......................... 307/10.1 |
| 5,646,455 | A | * | 7/1997 | Price ........................... 307/10.1 |
| 6,276,161 | B1 | * | 8/2001 | Peiffer et al. ................. 62/406 |
| 6,412,287 | B1 | * | 7/2002 | Hughes et al. ............... 62/3.61 |
| 6,457,324 | B1 | * | 10/2002 | Zeigler et al. ................ 62/406 |
| 6,637,709 | B1 | * | 10/2003 | Guenther et al. ........ 248/311.2 |

\* cited by examiner

*Primary Examiner*—Melvin Jones
(74) *Attorney, Agent, or Firm*—Earl LaFontaine; Artz & Artz, P.C.

(57) ABSTRACT

A thermally controlled storage space system (10), such as for the dashboard (40) of a vehicle (12). The system (10) has a housing (22), which is configured to couple a portion of the vehicles air control system (48), such as a heating system, a ventilation system, or an air-conditioning system. A heat exchanger (26) is coupled to the housing (22) and to a thermoelectric device (28). A temperature sensor (62) generates a temperature signal indicative of the temperature within the housing (22). A controller (18), which is coupled to the thermoelectric device (28), adjusts the temperature within the housing (22) in response to the temperature signal.

20 Claims, 3 Drawing Sheets

THERMALLY CONTROLLED STORAGE SPACE SYSTEM FOR AN INTERIOR CABIN OF A VEHICLE

BACKGROUND OF INVENTION

The present invention relates to in-vehicle thermally controlled containers and systems. More particularly, the present invention relates to a system for thermally controlling the environment within a storage space forward of a front occupant compartment of a vehicle.

Consoles, glove boxes, storage compartments, and other storage spaces are typically provided in the forward portion of the occupant compartment of a vehicle for the storage of various objects. The front occupant compartment refers generally to the space within the interior cabin of a vehicle between the wall, which separates the engine compartment from the interior cabin, and the B-pillars of the vehicle. The front compartment may include any space accessible by the occupants within the front seats of the vehicle.

It can be desirable to store objects in a temperature-controlled environment. As such, various refrigerator type designs and configurations have been utilized within the interior of a vehicle. These configurations have included both center console and dashboard designs. However, refrigerator type designs are limited to the cooling of objects. Also, refrigerator designs are generally complex and contain a large number of components, such as a compressor, a condenser, coolant plumbing, and other components associated therewith that tend to be bulky and costly.

Another cooling configuration has included the use of a cooling vent, which routes and directs cool air exterior of the vehicle into a storage space. Vented configurations, although being simple and inexpensive in design, do not provide a controlled temperature environment and are limited in their cooling and warming ability.

Thermoelectric devices are known, which utilize the Peltier effect in solid-state electrical components, to operate as small heat pumps. Thermoelectric devices include multiple thermocouples between heat sinks. The thermocouples transfer thermal energy from one heat sink to the other, dependent upon the direction of DC power applied to the thermocouples.

Thermoelectric devices have been utilized in a center console for controlling the temperature of a beverage container and a compartment within the center console therein. This center console design, although providing a temperature controlled environment requires separate and associated ductwork and air circulating fans, which can also be bulky and further increase costs of the vehicle.

All of the above mentioned configurations are not only limited as stated, but are also limited in mobility since they are rigidly fixed within the vehicle, are limited in activation and temperature control, are limited to in-vehicle control, and are limited in operating efficiency.

There is a continual demand for an increase in vehicle conveniences and vehicle system efficiency. Thus, there exists a need for an improved thermally controlled system for a storage space of a vehicle that is simple and space efficient, and which provides improved mobility, control, and operating efficiency.

SUMMARY OF INVENTION

The present invention provides a thermally controlled storage space system for a vehicle. The system includes a housing that may be configured to reside within a dashboard of the vehicle. The housing may also be configured to be coupled to a portion of a vehicle air control system, such as a heating system, a ventilation system, or an air-conditioning system. A heat exchanger is coupled to the housing and a thermoelectric device is coupled to the heat exchanger. A temperature sensor generates a temperature signal indicative of the temperature within the housing. A controller is coupled to the thermoelectric device and adjusts the temperature within the housing in response to the temperature signal.

The embodiments of the present invention provide several advantages. One advantage is the provision of an in-dash thermally controlled storage space system utilizing a thermoelectric device. The present invention provides a readily accessible, simple, thermally controlled storage space with a temperature-controlled environment therein.

Another advantage provided by an embodiment of the present invention is that it provides the provision of a thermally controlled storage space system utilizing a thermoelectric device and having a housing configured to couple to a vehicle air control system. This embodiment provides an efficient, simple, and inexpensive thermally controlled storage space with a temperature-controlled environment therein. Furthermore, the present invention is versatile in that it may be applied to various lock assemblies and ignition systems.

Moreover It is yet another advantage of an embodiment of the present invention to provide a thermally controlled storage space system having a heat exchanger that is shaped to support and efficiently transfer thermal energy to or from objects within a housing of the thermally controlled storage space system.

Furthermore, another advantage provided by an embodiment of the present invention is the ability to remotely control the operation of a thermally controlled storage space system of a vehicle.

Moreover, another advantage provided by an embodiment of the present invention is increased portability of a thermally controlled storage space of a vehicle.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
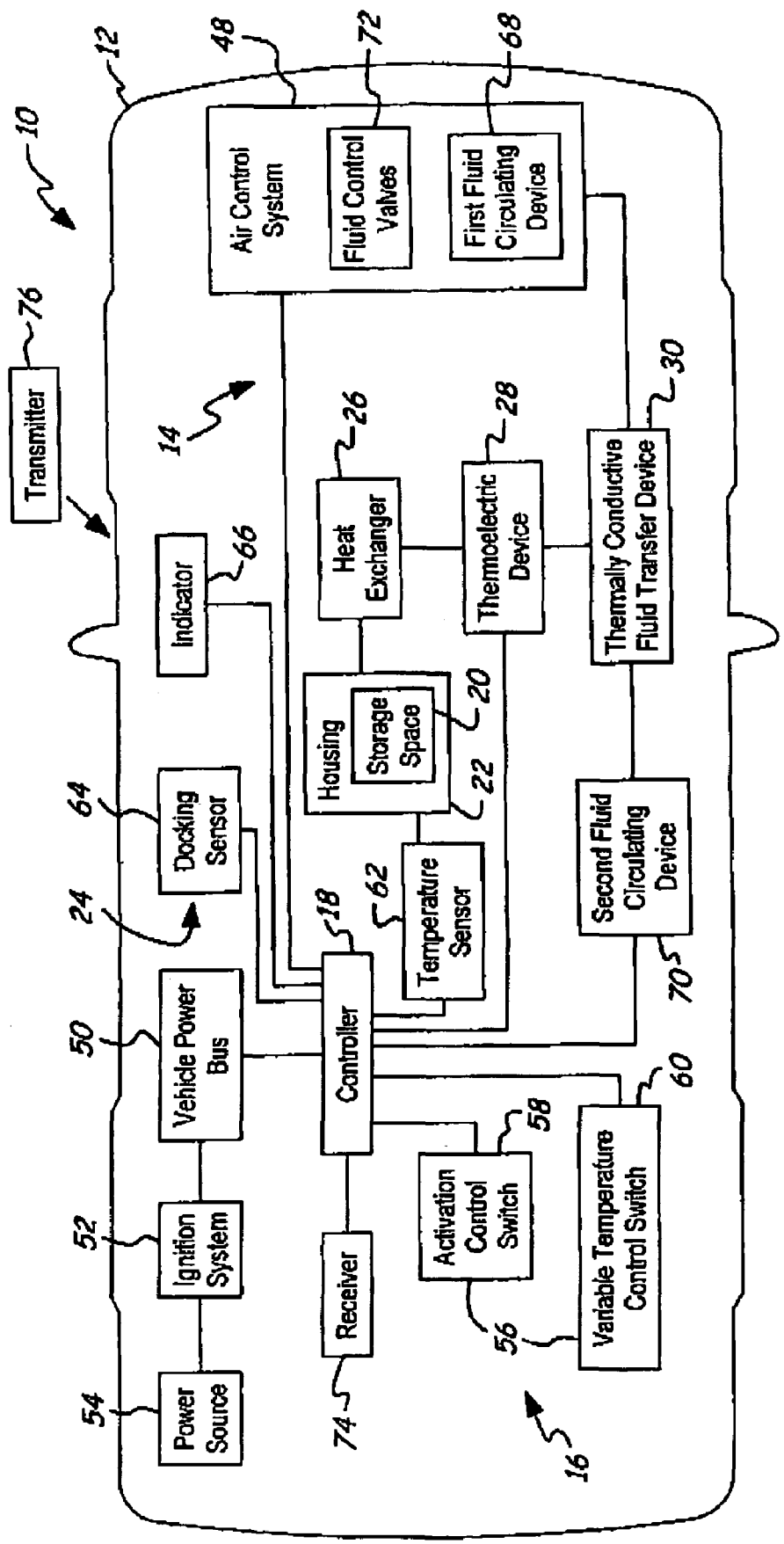
FIG. 1 is a block diagrammatic view of a thermally controlled storage space system for a vehicle in accordance with an embodiment of the present invention.

In the following figures the same reference numerals will be used to refer to the same components. While the present invention is described primarily with respect to a system for providing a thermally controlled storage space within a front occupant compartment of a vehicle, the present invention may be adapted and applied in various locations within a vehicle or may be applied in other non-vehicle applications. For example, the present invention may be applied to storage spaces within a dashboard, within a console, within an overhead compartment, in a front occupant compartment, in a passenger compartment, in a luggage compartment, in a door assembly, or in various other locations within a vehicle.

In the following description, various operating parameters and components are described for one constructed embodiment. These specific parameters and components are included as examples and are not meant to be limiting.

Also, in the following description the term "object" may refer to any article that may be stored, placed, inserted, or set into a storage space of a vehicle. An object may be, for example, a writing utensil, glasses, an owners manual, a beverage, or various other objects. An object also may be one for which cooling or warming thereof is desired.

Additionally, in the following description the term "system component" may refer to any component or system of components within a vehicle. For example, a vehicle component may refer to a switch, a sensor, circulating device, a vehicle air control system, an indicator, an ignition system, a lock, or other various components or systems within a vehicle.

As well, the term "key" refers to any access, unlocking, or component-starting device that may or may not have a specific identity. A specific identity may be an authorization code, a cut pattern, a magnetic field of a predetermined strength, or other identification parameter known in the art. A key may be active, such that it generates a transmission signal or magnetic field. A key may also be passive such that it simply has a specific cut pattern, size, length, style, reflective pattern, bar code, or other passive identification or authorization parameter known in the art. A key further may be a keyfob with an insertable portion that may be inserted into a lock assembly. A key may be of various sizes, shapes, styles, and forms as are known in the art. A few examples of a key are provided in the following description.

Referring now to FIG. 1, a block diagrammatic view of a thermally controlled storage space system 10 for a vehicle 12 in accordance with an embodiment of the present invention is shown. The storage space system 10 includes a thermal transfer circuit 14 and a control circuit 16. A controller 18, within the control circuit 16, monitors and adjusts temperature within a storage space 20 of a housing 22, of the thermal transfer circuit 14. In so doing, the controller 18 provides a thermally controlled environment within the housing 22. The storage space system 10 is generally located within an interior cabin 24 of the vehicle 12.

The thermal transfer circuit 14, in addition to the housing 22, includes a heat exchanger 26, a thermoelectric device 28, and a thermally conductive fluid transfer device 30. The thermal transfer circuit 14 transfers thermal energy to or away from the storage space 20. For example, when cooling the storage space 20, thermal energy within the storage space 20 is transferred into the heat exchanger 26, through the thermoelectric device 28, and into the fluid transfer device 30, where it is released therefrom. This process is reversed when warming the storage space 20. Although in the following figures a single heat exchanger 26, thermoelectric device 28, and fluid transfer device 30 are shown, any number of each may be utilized.

Figure 2:
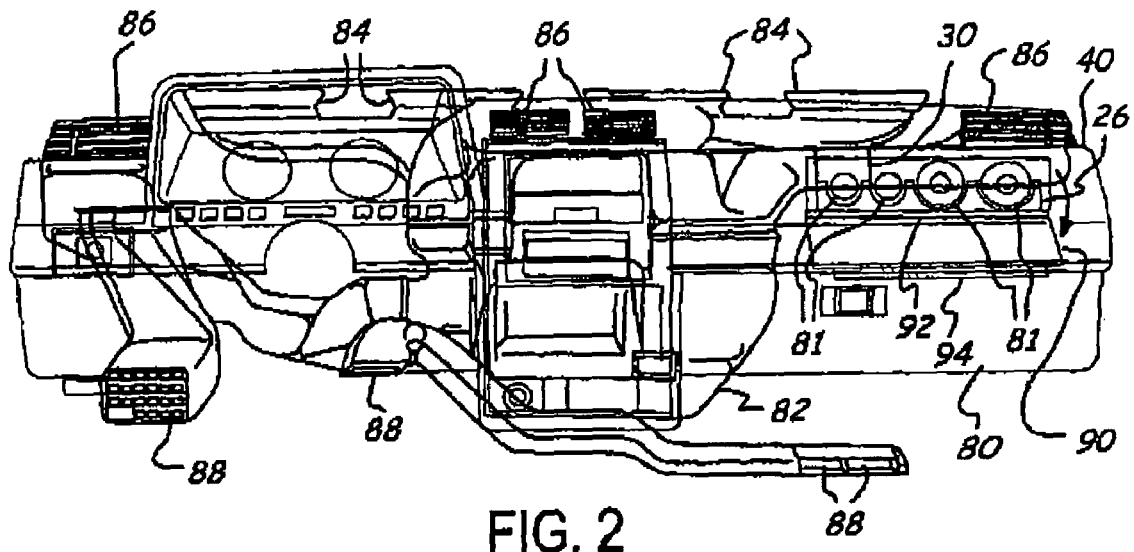
FIG. 2 is a front perspective view of a vehicle dashboard incorporating use of a thermally controlled storage space system in accordance with an embodiment of the present invention.
Figure 4:
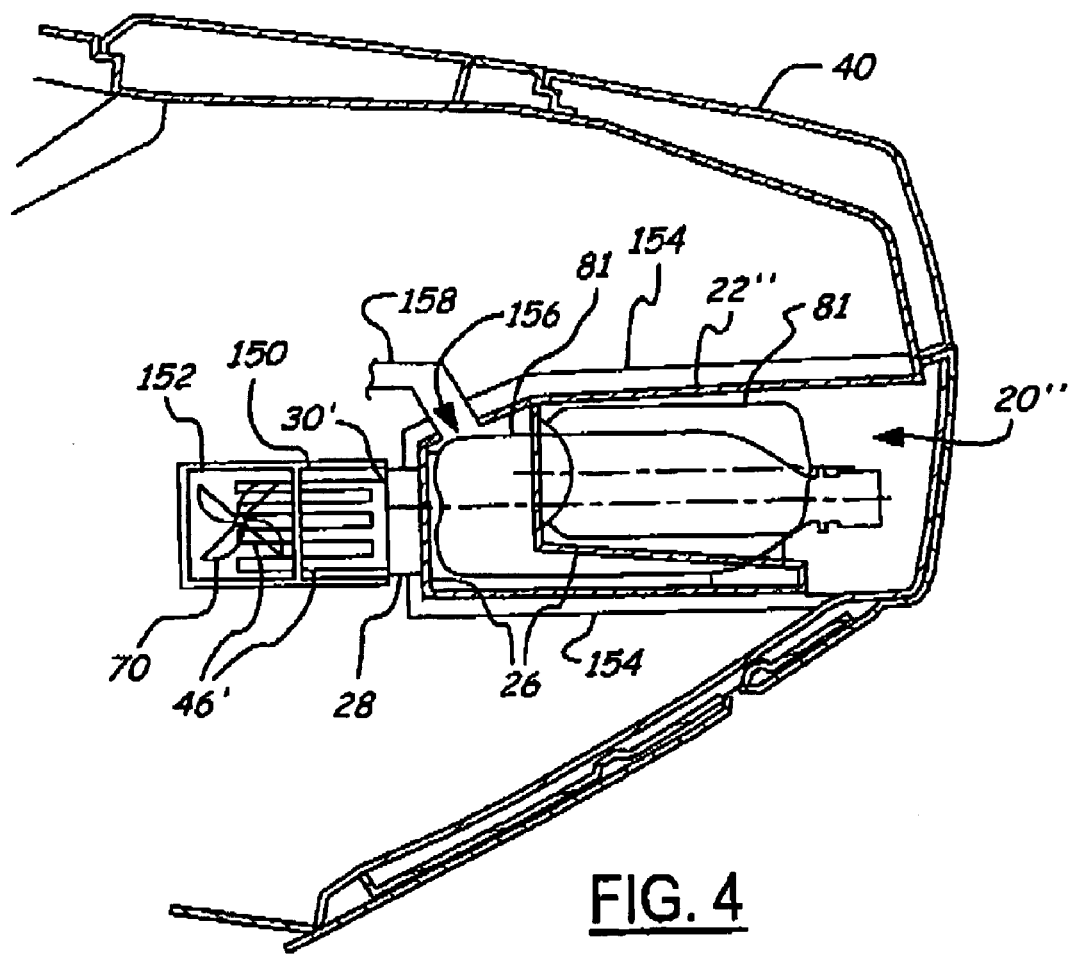
FIG. 4 is a side cross-sectional view of a dashboard incorporating a thermally controlled storage space system in accordance with another embodiment of the present invention.

The housing 20 may be located within a dashboard 40 of the vehicle 12, as shown in FIGS. 2 and 4, or may be located in various other locations, some of which are stated above. The housing 20 may be in various sizes, shapes, and styles. The housing 20 includes a thermally controlled environment, such as the storage space 22. The storage space 22 may be used for storage of various objects, as can be envisioned by one skilled in the art.

The heat exchanger 26 is thermally coupled to the housing 20 and may be in various sizes, shapes, and forms. One such example is provided in FIG. 4, which is described in detail below. The heat exchanger 26 may be formed as an integral part of the housing 20 or may be a separate stand-alone device. The heat exchanger 26 may be formed of various thermally conductive materials. In one embodiment of the present invention, the heat exchanger 26 is formed of aluminum, but may be formed of other highly conductive materials for efficient transfer of thermal energy.

Figure 3:
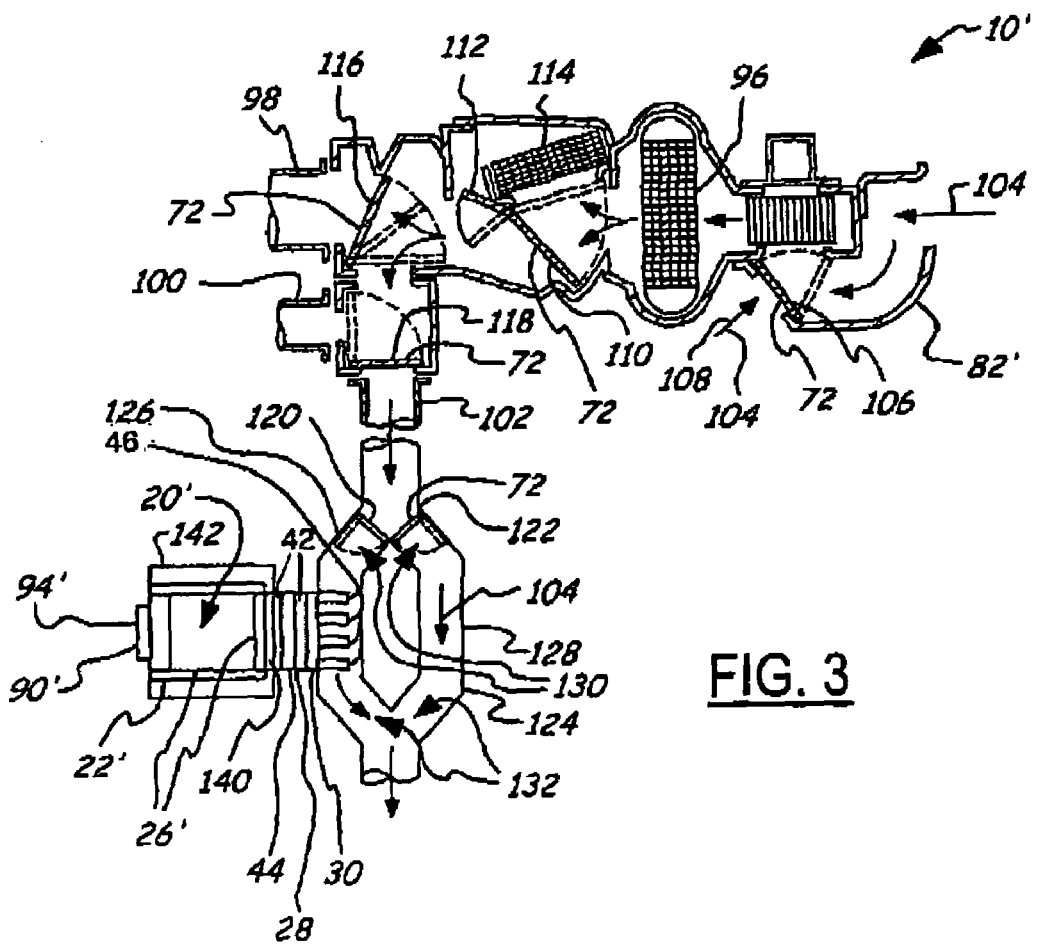
FIG. 3 is a top cross-sectional view of a thermally controlled storage space system illustrating fluid flow therein in accordance with another embodiment of the present invention.

The thermoelectric device 28 is thermally coupled to the heat exchanger 26 and includes a pair of wafers or plates 42 and multiple thermoelectric elements 44, which may be seen in FIG. 3. The plates 42 are thermally conductive and are also formed of a thermally conductive material, as known in the art. The plates 42 perform as heat sinks, one of which is a hot sink and the other is a cold sink, depending upon the direction of electrical current supplied thereto. The thermoelectric device 28 may also be of various sizes, shapes, and styles. One example of a thermal electric device that may be utilized is the thermoelectric device model number CZ1-1.4-127-1.65 by Tellurex™ Corporation.

The fluid transfer device 30 is thermally coupled to the thermoelectric device 28 and releases thermal energy therefrom. The fluid transfer device 30 may be in the form of a radiator and have fins 46, as shown in FIGS. 3 and 4 below, or may be in some other form known in the art, such as a metallic object used for dissipating thermal energy. The fluid transfer device 30 may also be of various sizes, shapes, and styles.

The thermal transfer circuit 14 may include one or more vehicle air control systems 48, such as a heating, ventilation, and air-conditioning (HVAC) system. The air control systems 48 may be in the form of a heating system, a ventilation system, and air-conditioning system, or may be in some other form of air control system known in the art. The air control system 48 may be coupled to the thermoelectric device 28 or the fluid transfer device 30 and provide cooling or warming thereof. This is described in further detail below with respect to the embodiments of FIGS. 3 and 4.

The control circuit 16, in addition to the controller 18, may also include various other control circuitry for the operation of the storage space system 10. Various system components and circuitry are described below, although a specific number of each are shown and described, any number of each may be utilized.

The controller 18 may be microprocessor based such as a computer having a central processing unit, memory (RAM and/or ROM), and associated input and output buses. The controller 18 may be application-specific integrated circuits or may include other logic devices known in the art. The controller 18 may be a portion of a central vehicle main control unit, an interactive vehicle dynamics module, or may be a stand-alone controller as shown.

The controller 18 is coupled to a vehicle power bus 50 from which it receives power. The vehicle power bus 50 may be coupled to an ignition system 52 and receive power from a power source 54. The controller 18 may be enabled upon activation of the ignition system 52. The controller 18 may be coupled to various control switches 56, such as an activation control switch 58 and a variable temperature control switch 60, as shown. The activation control switch 58 is used to activate or enable the storage space system 10 to provide a thermally controlled environment within the storage space 20. The temperature control switch 60 is used to adjust the temperature within the storage space. The controller 18 adjusts the temperature within the control space 20, depending upon the setting of the temperature switch 60. The temperature switch 60 may be analog or digital. The switches 56 may be adjusted manually or by the controller 18.

The controller 18 may also be coupled to a temperature sensor 62. The temperature sensor 62 is coupled to the thermal transfer circuit 14 and generates a temperature signal indicative of the temperature within the storage space 20. The controller 18 compares the value of the temperature signal with a desired temperature setting on the temperature switch 60 and adjusts temperature within the storage space 20, accordingly.

The controller 18 may also be coupled to a docking sensor 64 and an indicator 66. The docking sensor 64 and the indicator 66 are used to determine and indicate to a vehicle occupant whether the housing 22 is properly inserted into the dashboard 40, which is described in further detail below with respect to the embodiment of FIG. 3. The docking sensor 64 and the indicator 66 may be of various type and style known in the art. The docking sensor 64 may be infrared based, electromagnetic based, resistive or current based, or based on some other sensing technique known in the art. The docking sensor 64 may be in the form of a series of magnets, a coil, a potentiometer, an encoder, an optical sensor, an infrared sensor, a hall effect sensor, position sensor, or in some other form known in the art. The indicator 66 may also indicate temperature within the storage space 20. The indicator 66 may include an LED, a video system, an audio system, a light, or other indicator known in the art.

The control circuit 16 may include a first fluid circulating device 68 and a second fluid circulating device 70. The first fluid circulating device 68 may be part of the air control system 48 whereas the second fluid circulating device 70 may be separate from the air control system 48. The circulating devices 68 and 70 may be in the form of fans, blowers, pumps, or in some other form known in the art to circulate, pump, pass, force, or direct fluid across the fluid transfer device 30. The fluid may be in a gaseous or liquid state. The fluid may be in the form of air or may be in the form of a thermally conductive liquid.

The control circuit 16 may also include various control valves 72, examples of which are shown in FIG. 3. The valves 72 may be utilized in allowing and adjusting the flow of fluid to and from the fluid transfer device 30. The valves 72 may be in various sizes, shapes, and styles.

In addition, the control circuit 16 may include a receiver 74 and a transmitter 76. The receiver 74 is coupled to the controller 18 and receives a control signal from the transmitter 76. The transmitter 76 may be in the form of a keyfob or may be in some other form known in the art. The receiver 74 and the transmitter 76 may be part of an active or passive vehicle remote access or ignition enabling system. The transmitter 76 allows an operator to remotely operate the storage space system 10. The operator may active and adjust temperature of the storage space system 10 remotely from the vehicle 12.

Referring now to FIG. 2, a front perspective view of the dashboard 40 incorporating use of the storage space system 10 in accordance with an embodiment of the present invention is shown. Although, the storage space system 10 is shown as being located within the dashboard 40, forward of a front passenger seat (not shown), and above a glove compartment 80, as stated above, it may be in various other locations. The storage space system 10 may even replace the glove compartment 80. The heat exchanger 26 is shown supporting multiple beverage containers 81.

Ductwork 82 for the passage of air to the interior cabin 24 is shown, including defroster vents 84, panel vents 86, and floor vents 88, which may be used for heating, ventilation, and air-conditioning of the interior cabin 24. The ductwork provide a dual purpose configuration in that the thermal transfer device 30 is coupled to the ductwork 82, such that when the air control system 48 is activated to adjust temperature within the interior cabin 24, temperature within the storage space 20 may also be adjusted. This dual configuration provides efficient use of the air flowing through the ductwork 82. Also, this dual configuration provides a simple and cost effective manner of adjusting temperature of the thermal transfer device 30 and thus, temperature of the storage space 20. Although the transfer device 30 is shown as being coupled to an air passage leading to a panel vent, the transfer device may be coupled to any air passage of ductwork 82.

The housing 22 is configured to couple the air control system 48 and is in operable communication therewith. The housing 22 includes a door 90 for access to the storage area 20. The door 90 may include a hinge 92 and an access handle 94, as shown. Any number of hinges and access handles may be used. The door 90 may be held in a closed position through use of snaps, magnets, clips, locks, inertial devices, or other devices known in the art. The locks may be keyed. The door 90 may swing open into the front occupant compartment, as shown, may roll up or slide into the dashboard 40, or may open and close in some other fashion. The door 90 may be transparent for easy viewing of the contents of the housing 22. The handle 94 may be fixed or be in the form of levers. The handle 94 may be protruding, into the front occupant compartment, or recessed, within the door 90.

Referring now to FIG. 3, a top cross-sectional view of a thermally controlled storage space system 10', illustrating fluid flow therein, is shown in accordance with another embodiment of the present invention. Air enters the ductwork 82', passes through an evaporator core 96, and may be directed to the floor vents 88, to the defroster vents 84, to the panel vents 86, via a first passage 98, a second passage 100, and a third passage 102, respectively.

The valves 72 are used to direct the flow of the air, represented by arrows 104. A first valve 106 is used to select between air exterior or interior to the interior cabin 24. Air from the interior cabin may be referred to as recirculating air, represented by arrow 108. A second valve 110 and a third valve 112 are used to direct the air 104 through a heater core 114. A forth valve 116 is used to direct air 104 through the first passage 98. A fifth valve 118 is used to direct the air 104 through the second passage 100. A sixth valve or a storage system valve 120 and a seventh valve 122 are used to direct air across or by-pass the fluid transfer device 30. The storage system valve 120 and the seventh valve 122 reside within a dual passage member 124. Various vacuum and non-vacuum techniques known in the art may be utilized in operation of the valves 72.

Although the fluid transfer device 30 is shown as being coupled to the ductwork 82', the fluid transfer device 30 may be coupled to a vehicle air-conditioning circuit or heating circuit, portions of which are shown by the evaporator core 96 and the heater core 114. Liquid coolant within the air-conditioning circuit and the heating circuit may be passed across the fluid transfer device 30, thereby also cooling or heating the storage space 20'.

The dual passage member 124 has a storage system passage 126 and a vent passage 128, each of which having inlets 130 and outlets 132. Although the outlets 132 are coupled to each other such that the air 104 is directed into the interior cabin 24, the outlets 132 may be separated to allow the air 104, that passes across the fluid transfer device 30, to be directed exterior to the interior cabin 24 or exterior to the vehicle 12.

The fluid transfer device 30 is coupled to a docking connector 140, which is coupled to a docking support structure 142. The docking support structure 142 is configured to allow the insertion and removal of the housing 22' therefrom. A heat exchanger 26 within the housing 22' is coupled to the connector 140. The housing 22' has a door 90' with a handle 94'. The handle 94' may be used for the opening and closing of the door 90', as well as for the insertion and removal of the housing 22' from the support structure 142. The housing 22' and the support structure 142 may have guides (not shown) or may be keyed for aiding in the alignment and coupling between the housing 22' and the support structure 142.

Although a heat exchanger 26' is shown as being coupled within the housing 22' such that it is removed from the support structure 142 with the housing 22', other configurations can be envisioned by one skilled in the art, a couple examples of which are stated below. As one example, the heat exchanger 26' may be separate from and not reside within the housing 22' such that the housing 22' may be removed alone. As another example, the connector 140, instead of coupling the heat exchanger 26' to the thermoelectric device 28, may couple the fluid transfer device 30 to the dual passage member 124 such that the housing 22' along with the heat exchanger 26, the thermoelectric device 28, and the fluid transfer device 30 can be removed from the support structure 142 and utilized elsewhere. The housing 22' may be insulated, as shown in FIG. 4, and may be used as a portable thermally insulated container. The housing 22' after being removed from the support structure 142 may be operated through use of an external power source (not shown).

Referring now to FIG. 4, a side cross-sectional view of the dashboard 40 incorporating a thermally controlled storage space system 10" in accordance with another embodiment of the present invention is shown. The beverage containers 81 are shown within the storage space 20" and are supported by the heat exchanger 26. The heat exchanger 26 is coupled to the thermoelectric device 28, which in turn is coupled to a fluid transfer device 30'. The fluid transfer device 30' is in the form of a radiator and has multiple fins 46' that extend within a first fluid passage 150 and a second fluid passage 152. Thermal energy may be radiated or received from the fluid transfer device 30' within the passages 150 and 152. A significant portion of the housing 22" is contained within an insulating member 154.

The first fluid passage 150 is coupled to the air control system 48 whereas the second fluid transfer device 152 is coupled to the second circulating device 70. Temperature within the storage space 20" may be adjusted through use of either the air control system 48, through use of the second circulating device 70, or a combination thereof.

The housing 22" may have a vent 156. Air may be directed from either the air control system 48 or from the second circulating device 70, via a manifold 158, into the storage space 20". The ventilation of the storage space 20" may be used to further adjust temperature of the storage space 20" and increase operating efficiency of the storage space system.

Figure 5:
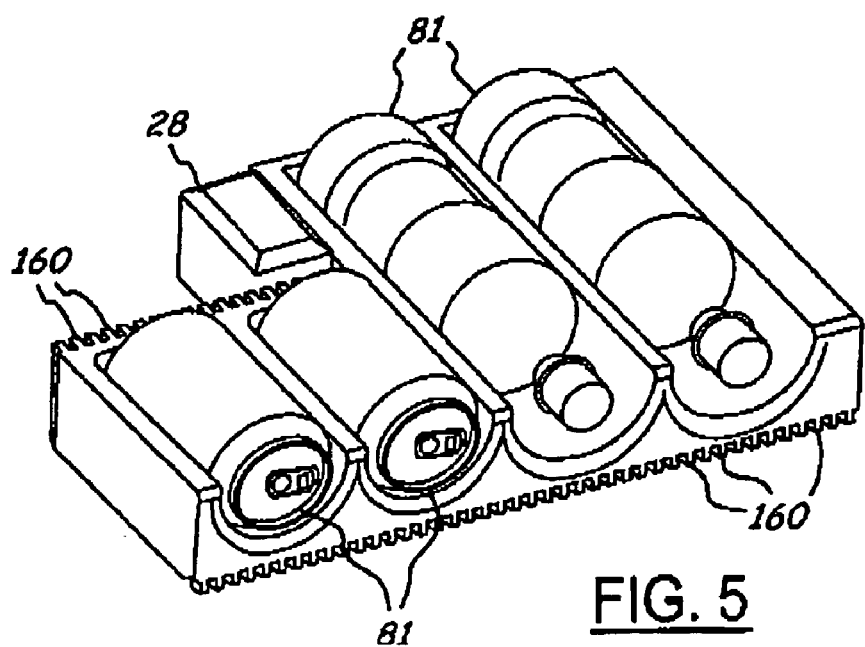
FIG. 5 is a perspective view of a heat exchanger in accordance with an embodiment of the present invention.

Referring now to FIG. 5, a perspective view of a heat exchanger 26 in accordance with an embodiment of the present invention is shown. The heat exchanger 26 is shaped and has contours that are similar to that of the beverage containers 81. The beverage containers 81 are held and supported by the heat exchanger 26, which prevents movement of the containers 81 within the storage spaces 20, 20', and 20". Also, due to the size and shape of the heat exchanger 26, a substantially large contact surface area exists between the heat exchanger 26 and the containers 81, which provides efficient cooling or warming thereof. The heat exchanger 26 may include radiating fins 160 to further provide efficient cooling of the containers 81. In one embodiment of the present invention, the heat exchanger 26 is directly coupled to the thermoelectric device 28, as shown.

The present invention provides a simple, inexpensive, and efficient thermally controlled storage space system for a vehicle. The storage space system is portable and may be operated remotely from the vehicle.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An in-dash thermally controlled storage space system for a vehicle comprising:
    a housing configured to reside within a dashboard of the vehicle;
    at least one heat exchanger coupled to said housing;
    at least one thermoelectric device coupled to said at least one heat exchanger and in thermal communication with said housing, said at least one heat exchanger thermally conducting energy between said housing and a non-storage space;
    a temperature sensor generating a temperature signal indicative of temperature within said housing; and
    a controller coupled to said thermoelectric device and adjusting temperature within said housing in response to said temperature signal.

2. A system as in claim 1 wherein said housing is configured to couple at least a portion of at least one vehicle air control system selected from a heating system, a ventilation system, and an air-conditioning system.

3. A system as in claim 2 wherein said at least one thermoelectric device is coupled to said at least one vehicle air control system such that thermal energy is transferred therebetween.

4. A system as in claim 2 further comprising a thermally conductive fluid transfer device coupled to said at least one thermoelectric device such that thermal energy is transferred therebetween.

5. A system as in claim 4 further comprising at least one fluid circulating device coupled to said controller, said controller adjusts temperature within said housing by circulating a fluid within said at least one vehicle air control system to transfer thermal energy between said housing and said at least one vehicle air control system.

6. A system as in claim 5 wherein said fluid is selected from at least one of air and liquid.

7. A system as in claim 5 wherein said at least one fluid circulating device is a device selected from at least one of a fan, a blower, a pump, a fan of said at least one vehicle air control system, a blower of said at least one vehicle air control system, and a pump of said at least one vehicle air control system.

8. A system as in claim 4 wherein said thermally conductive fluid transfer device is in the form of a radiator.

9. A system as in claim 4 wherein said controller adjusts temperature within said housing by circulating a fluid across said thermally conductive fluid transfer device.

10. A system as in claim 4 wherein said thermally conductive fluid transfer device is at least partially contained within said at least one vehicle air control system.

11. A system as in claim 1 wherein said at least one heat exchanger is contoured to support at least one object within said housing.

12. A system as in claim 1 further comprising at least one control switch coupled to said controller and controlling operation of the in-dash thermally controlled storage space system.

13. A system as in claim 1 further comprising a temperature control switch coupled to said controller and setting temperature within said housing.

14. A system as in claim 1 further comprising:
a transmitter generating a control signal; and
a receiver coupled to said controller;
said controller operating the in-dash thermally controlled storage space system in response to said control signal.

15. A system as in claim 14 wherein said controller in operating the in-dash thermally controlled storage space system performs a task selected from at least one of activation, deactivation, and temperature adjustment.

16. A system as in claim 1 further comprising a docking support structure coupled within said dashboard, said housing configured to be removable from said docking support structure.

17. A system as in claim 1 further comprising:
a sensor coupled to said docking support structure; and
an indicator coupled to said sensor and indicating when said housing is in said docking support structure.

18. A system as in claim 1 wherein said housing comprises a vent.

19. A thermally controlled storage space system for a vehicle comprising:
a housing coupled to and in thermal communication with at least a portion of at least one vehicle air control system;
at least one heat exchanger coupled to said housing;
at least one thermoelectric device coupled to said at least one heat exchanger;
a temperature sensor generating a temperature signal indicative of temperature within said housing; and
a controller coupled to said thermoelectric device and adjusting temperature within said housing in response to said temperature signal.

20. An in-dash thermally controlled storage space system for a vehicle comprising:
a housing configured to reside within a dashboard of the vehicle and couple at least a portion of at least one vehicle air control system selected from a heating system, a ventilation system, and an air-conditioning system;
a temperature sensor generating a temperature signal indicative of temperature within said housing;
at least one heat exchanger coupled to said housing;
at least one thermoelectric device coupled to said at least one heat exchanger;
a thermally conductive fluid transfer device coupled to said at least one thermoelectric device and residing at least partially within said at least one vehicle air control system;
at least one fluid circulating device directing a fluid to said thermally conductive fluid transfer device; and
a controller coupled to said thermoelectric device and said at least one fluid circulating device, said controller adjusting temperature within said housing in response to said temperature signal.

* * * * *